Nov. 19, 1963 — P. O. W. HOPKINSON — 3,111,091

APPARATUS FOR REDUCING FLUID PRESSURE

Filed March 2, 1962 — 3 Sheets-Sheet 1

INVENTOR.
PAUL O. W. HOPKINSON
BY
Brown, Critchlow, Flick & Peckham.
ATTORNEYS.

Nov. 19, 1963    P. O. W. HOPKINSON    3,111,091
APPARATUS FOR REDUCING FLUID PRESSURE
Filed March 2, 1962    3 Sheets-Sheet 2

INVENTOR.
PAUL O. W. HOPKINSON
BY
Brown, Critchlow, Flick & Peckham.
ATTORNEYS.

United States Patent Office 3,111,091
Patented Nov. 19, 1963

3,111,091
APPARATUS FOR REDUCING FLUID PRESSURE
Paul O. W. Hopkinson, Gibsonia, Pa., assignor to St. Barnabas Free Home, Inc., Gibsonia, Pa., a corporation of Pennsylvania
Filed Mar. 2, 1962, Ser. No. 177,110
11 Claims. (Cl. 103—262)

This invention relates to the reduction of fluid pressure, and more particularly to the accomplishment of that purpose by means of a flowing stream.

One simple way of drawing a fluid or flowable material into a fluid stream has been to direct the stream through a venturi tube. The increase in velocity of the stream at the throat of the venturi reduces the pressure in that area so that the desired material or fluid can be injected into the stream. In such a device the pressure depends exclusively on velocity of flow, which is, in turn, a function of the diameter of the passage.

It is among the objects of this invention to provide apparatus for reducing fluid pressure materially, which does not depend upon a venturi effect, which is much more efficient than a venturi, which operates satisfactorily at low fluid velocities and against high back pressure, which will maintain a given low pressure over a considerable range of back pressure, and which is simple in construction and operation.

In accordance with this invention a stream of fluid is directed through a passage, in which at a predetermined point it is compelled to flow across a knife edge. Just before the stream reaches the knife edge, a portion of it is directed substantially perpendicularly against the rest of the stream to displace a short section of the stream from the knife edge. This produces a locus of cavitation at the knife edge. Immediately beyond the displaced section of the stream its streamlined flow is controlled. The locus of cavitation is connected with a conduit or receptacle, in which it is desired to reduce the pressure. Flowable material in such a conduit or receptacle therefore will be drawn into the flowing fluid stream.

The invention is illustrated in the accompanying drawings, in which

Figure 1:
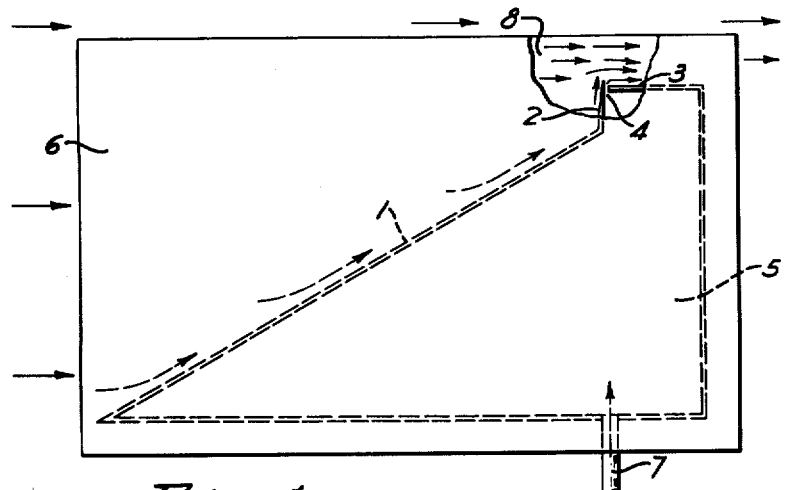
FIG. 1 is a side view of a device illustrating the principles of my invention.
Figure 2:
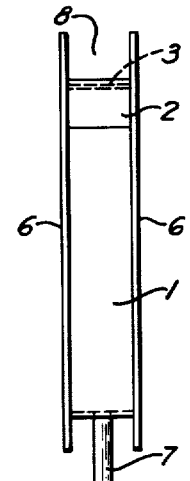
FIG. 2 is a view of the inlet end of the device.

The basic principle of my invention is illustrated in FIGS. 1 and 2 of the drawings. A metal strip is provided with an inclined portion 1, at the upper end of which the strip is bent substantially perpendicular to the horizontal axis of the device to form a deflector 2. The strip also extends from the lower end of the inclined portion forward beyond the deflector and then upward and back to form a horizontal portion 3 that stops a very short distance from the deflector to form a gap 4. The gap should be very small, such as about 0.010, but this will vary somewhat with pressure and velocity of the fluid. Sealed to opposite sides of the strip in order to form a chamber 5 bounded by the strip are two parallel plates 6. An inlet tube 7 is connected to the chamber, such as at its bottom. The upper end of the deflector is formed with a sharp edge. The device thus formed is a flow member, through the upper part of which there is an open sided fluid passage 8 with an inlet at the left-hand end and an outlet at the opposite end. The inclined portion 1 of the metal strip forms one wall of the passage inclined toward its outlet end. The portion 3 of the strip continues that wall on the opposite side of deflector 2.

When this device is placed in a fluid stream flowing to the right in FIG. 1, or is pulled to the left through a body of fluid, part of the fluid will flow up the incline 1 until it is deflected upward by the deflector 2. At the point of impingement of the upwardly directed fluid against the horizontally flowing portion of the stream above it, the stream lifts away from the knife edge of the deflector because the force of the upwardly directed fluid impulse is considerably greater than the head producing it. That is, assuming that the approach to the knife edge is practically friction free, the upwardly directed part of the stream hits the horizontally flowing portion with about twice the force of the main stream head. The result is that the stream is diverted upwardly away from the knife edge to produce cavitation over gap 4. A reduced pressure is therefore formed at the gap, which communicates with chamber 5 and tube 7. It can be seen that no venturi effect is involved, because a fluid stream is not constricted and passed through a venturi tube, yet the device just described will produce a vacuum of 5 to 10 inches of water at a rate of flow of water of approximately 7 feet per second. Of course, it makes no difference whether the device is positioned with gap 4 up, down or at the side. Although FIGS. 1 and 2 are mainly to illustrate the fundamented principle of operation of my impulse-cavitation pressure reducer, the embodiment shown could be attached to a boat below the water line and used to draw water out of the boat.

Figure 3:
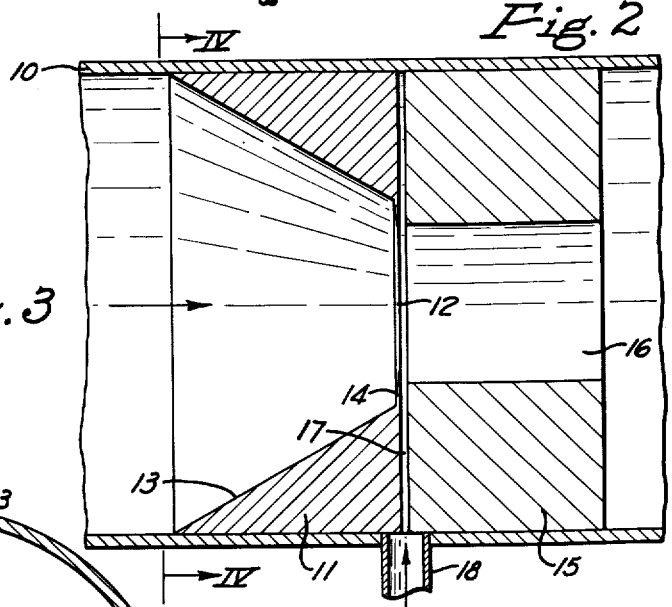
FIG. 3 is a vertical longitudinal section through a more practical embodiment of the invention.
Figure 4:
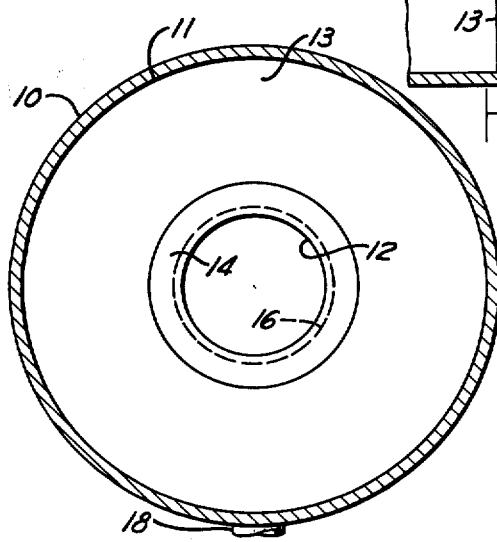
FIG. 4 is a cross section taken on the line IV—IV of FIG. 3.

An adaptation of my invention to a more generally useful form is shown in FIGS. 3 and 4. In this case the fluid flows through a tube or pipe 10, in which there is a circular restricting element 11 that has a central opening through it. The opening converges from substantially the periphery of the element to a point near its outlet end. The degree of taper or convergence is not critical, but an inclination of about 30° has been found to be very practical. The orifice 12, formed by the outlet of the converging opening, is connected to the adjacent end of the inclined or tapered wall 13 by a thin narrow deflector 14 that is nearly radial to the center of the orifice. To provide the deflector with an inner knife edge, one side of the deflector preferably is at a 90° angle to the axis of the orifice, while the other side is at about an 87° angle for manufacturing convenience. Although the width of the deflector is not especially critical, it has been found that if it is equal to about ¼ the diameter of the orifice, very satisfactory results are obtained.

Spaced a very short distance from the outlet end of restricting element 11, such as the distance across gap 4 in FIG. 1 or as much as 0.100 inch, there is a bushing 15 that has an axial passage 16 through it, which is substantially the same size as orifice 12. As far as performance is concerned, they could be exactly the same size or passage 16 could even be slightly smaller than the orifice if aligned accurately with it. However, to prevent any possibility of misalignment if the passage were smaller, it is preferred to make it slightly larger than the orifice. The annular chamber 17, formed by the gap between the two elements 11 and 15, is connected by a tube 18 with the supply of material that is to be injected into the main stream.

As the fluid flows through this flow member, the stream is gradually constricted by the sloping wall 13 of the tapered opening through restricting element 11, and the peripheral portion of the stream is deflected radially inward by annular deflector 14 to strike perpendicularly the rest of the stream passing through orifice 12. This is completely different from what occurs in a venturi tube. The impulse is strong enough to force the stream inward away from the knife edge of the orifice in order to constrict the stream still further and provide a locus of cavitation around it in the annular chamber 17, thereby reducing the fluid pressure in that chamber. Shortly after that, the stream expands into engagement with the inner surface of bushing 15, which serves two purposes that now will be explained.

Back pressure in general is the pressure that exists in the pipe downstream from my pressure reducer, due to tank pressure, pipe friction, etc. On the other hand, back pressure in the immediate vicinity of the pressure reducer depends upon local turbulence. If no bushing were used, the fluid jet issuing from orifice 12 would impinge on the fluid immediately past the orifice and turbulence would be produced, which would build up local pressures and destroy the action of the pressure reducer. Bushing 15 protects chamber 17 from such local back pressures. Furthermore, when there is very little back pressure, such as when the discharge is to atmospheric pressure immediately following the pressure reducer, into tube 21, the latter may be provided with a second port 33 in its top at the upstream end of restricting element 22. This hole is connected by a passage 34 in the block with passage 30. Passage 34 normally is closed by a valve 35 screwed into the block, but if the pressure reducer is producing too high a vacuum in chamber 23, the valve can be opened the desired amount in order to allow some of the main stream to bypass the restricting element and enter the chamber with the wetting agent, whereby the vacuum will be reduced and less wetting agent will be drawn into the tube.

Figure 5:
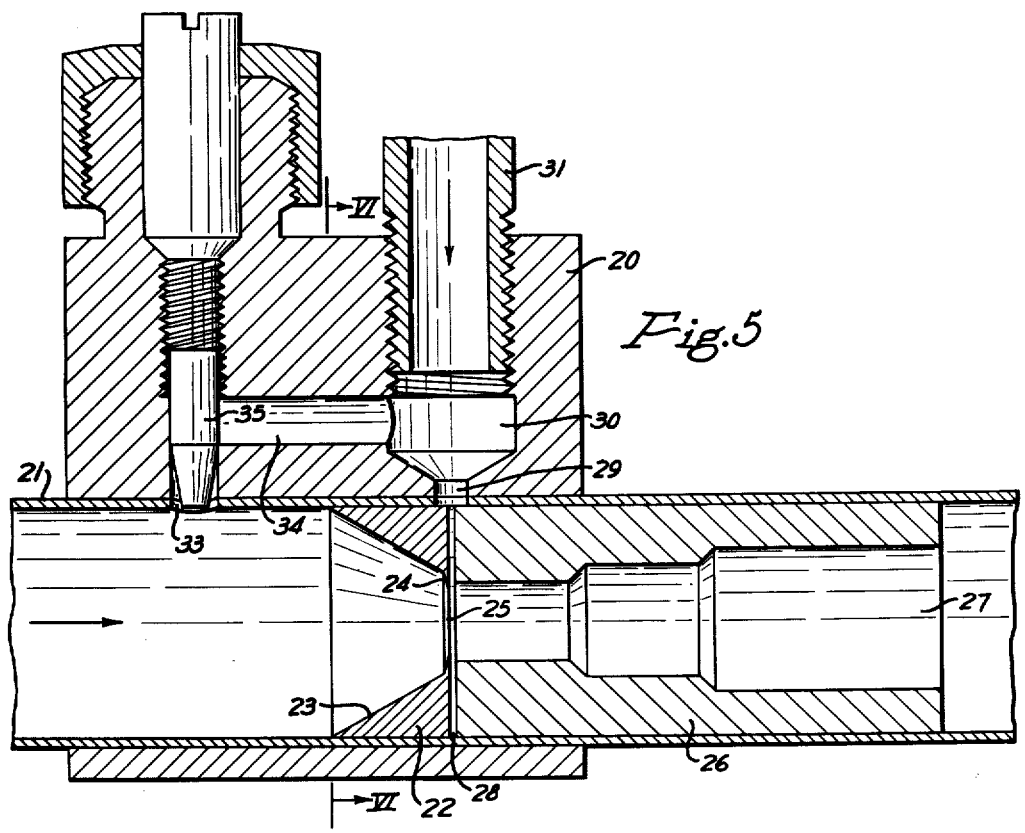
FIG. 5 is principally a longitudinal section through a working embodiment of the invention.
Figures 6, 7:
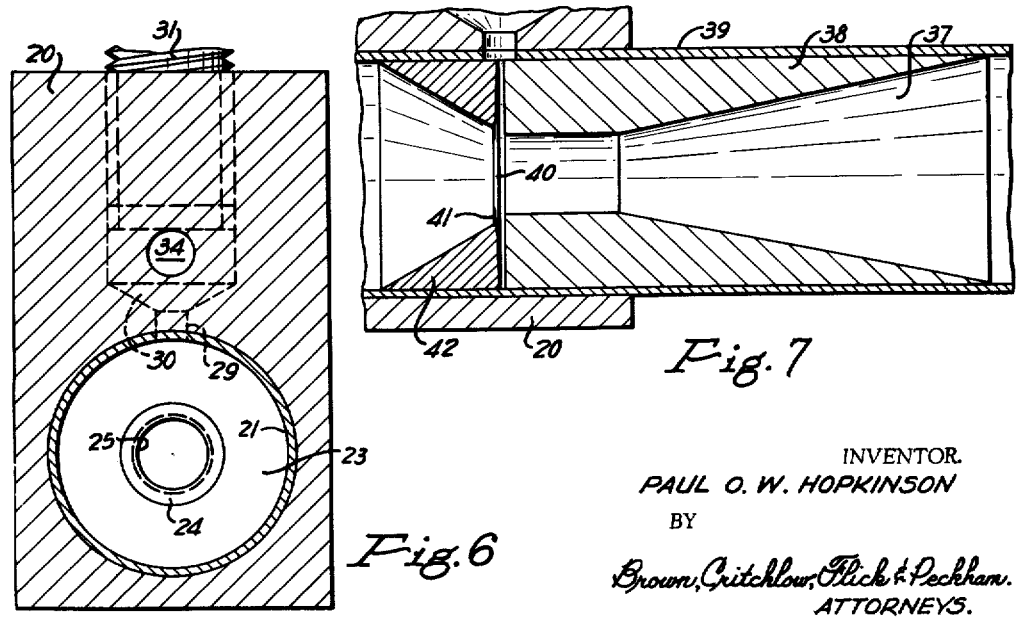
FIG. 6 is a cross section taken on the line VI—VI of FIG. 5.
FIG. 7 is a fragmentary longitudinal section through another modification.

The device shown in FIG. 7 is essentially the same as the one shown in FIG. 5 except for two things in the flow member. The passage 37 through the long bushing 38 has a cylindrical upstream end, from which the passage flares downstream to the inner surface of the tube 39. This insures a smooth transition of the fluid jet from its restricted diameter at orifice 40 to the inner diameter of the tube. The other change is in the deflecting area 41 of the restricting element 42. Instead of the downstream side of the deflector being radial, the upstream side is made radial and the downstream side is inclined to the axis of the orifice at a slight angle. This is another way of making the restricting element, but it does not affect the operation of the pressure reducer.

Figure 8:
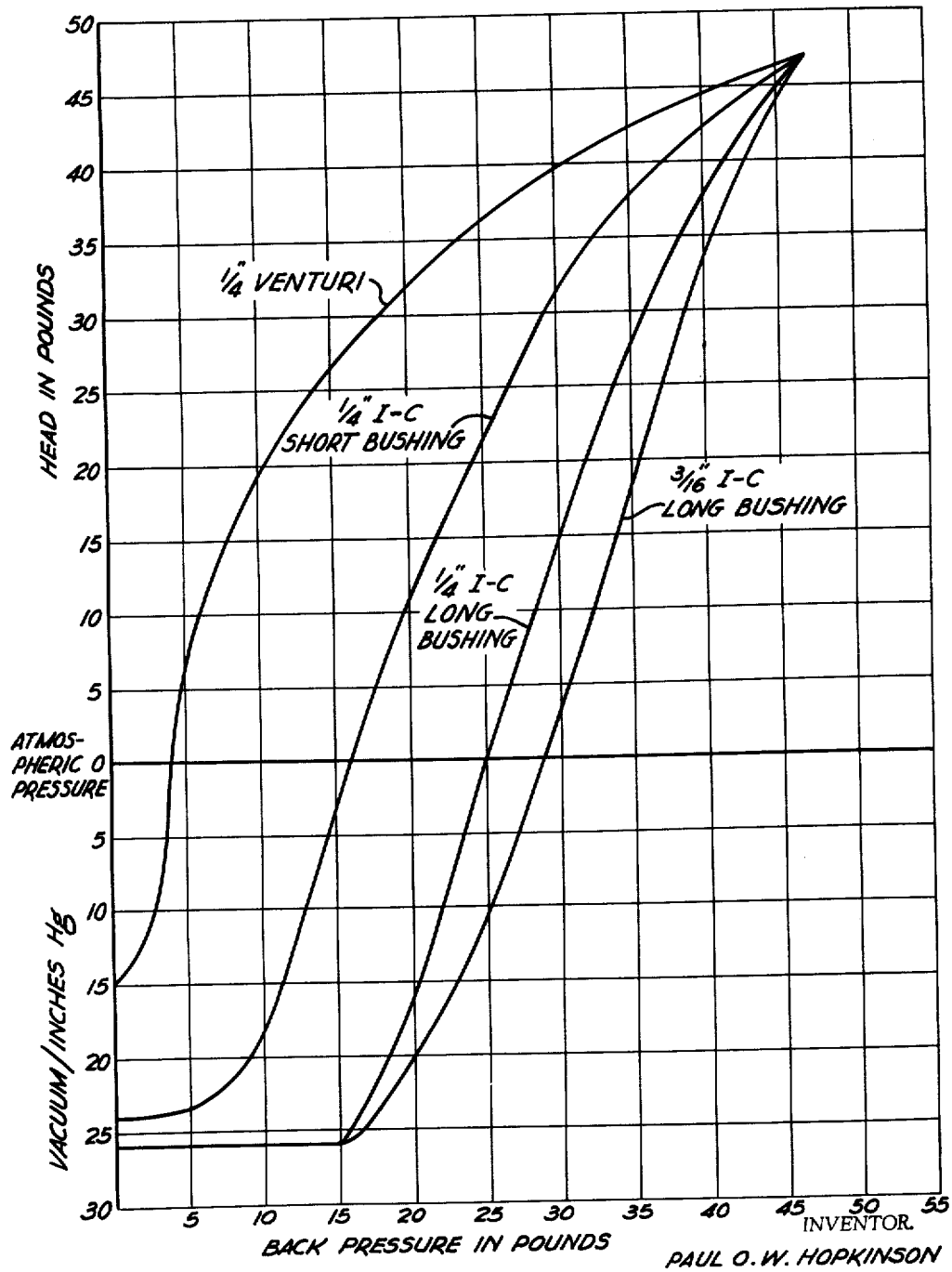
FIG. 8 is a graph comparing the performance of my impulse-cavitation device with a venturi.

The graph or chart in FIG. 8 shows curves illustrating a comparison of a venturi with my impulse-cavitation pressure reducer in the same apparatus using a fixed head of about 47 pounds per square inch and variable back pressures. That is, water under a pressure of 47 pounds per square inch was delivered to a venturi tube having a ¼ inch throat and having its outlet connected to a tank. The back pressure in the tank could be varied. A vacuum gage was connected to the low pressure zone of the venturi to measure the pressure at that point. It will be seen by the graph that the pressure in the low pressure zone of the venturi did not decrease to atmospheric until the back pressure was reduced to about 4 pounds per square inch. Of course, the back pressure would have to be reduced a little further before a fluid under atmospheric pressure would be drawn into the low pressure zone of the venturi and injected into the line. Even with no back pressure, the highest vacuum that could be produced by the venturi was about 15 inches of mercury.

On the other hand, when my impulse-cavitation device with a ¼ inch diameter orifice and with the short bushing shown in FIG. 4 was substituted for the venturi, the pressure in the cavitation chamber was reduced to atmospheric while the back pressure was still about 16 pounds per square inch. At 15 pounds back pressure, the vacuum in the cavitation chamber equaled about 3 inches of mercury, so fluid at atmospheric pressure could be drawn into the main stream. With no back pressure, my device produced a vacuum of about 24 inches of mercury, a great deal more than the venturi did.

By substituting the long bushing of FIG. 5 or FIG. 7 for the short bushing, my device starts to produce a vacuum while the back pressure is just below 25 pounds per square inch. At only 5 pounds less back pressure; namely, about 20 pounds, the vacuum reaches 16 inches of mercury, which is a higher vacuum than the venturi tube could create with no back pressure at all. At 15 pounds back pressure, the vacuum produced by my device is equivalent to about 26 inches of mercury and remains substantially that as the back pressure is further reduced.

In case the size of the orifice in my impulse-cavitation pressure reducer with the long bushing is reduced to 3/16 inch, atmospheric pressure will be reached in the cavitation chamber while the back pressure is as high as about 28 pounds per square inch. With any lower back pressure, a vacuum is created, which goes up to about 26 inches of mercury at 15 pounds back pressure.

It will be seen from this graph that with my device atmospheric pressure in its low pressure zone is reached at back pressures that are many higher than is possible with a venturi tube having the same size orifice, and that my device can produce a much higher vacuum than is possible with the venturi. Of course, the same advantages take place if the back pressure is fixed and the head of pressure varies. The impulse-cavitation pressure reducer will produce a vacuum in its cavitation chamber with a much lower head than is possible with a venturi of the same size.

I claim:

1. An impulse-cavitation pressure reducer comprising a flow member having a fluid passage therethrough provided with inlet and outlet ends, the passage having a wall inclined part way across it toward its outlet end and then extending substantially perpendicularly to the longitudinal axis of the passage and terminating in a knife edge, and a wall extending lengthwise of the passage a slight distance from the downstream side of said knife edge and forming a gap between them, whereby the fluid pressure in said gap will be reduced as fluid flowing through said passage leaves the knife edge, and said member being provided with an inlet connected with said gap.

2. A pressure reducer according to claim 1, in which the width of said gap is between about 0.010 and 0.100 inch.

3. A pressure reducer according to claim 1, in which said inclined wall is at only one side of said passage, and the opposite side of the passage is open.

4. A pressure reducer according to claim 1, in which said flow member is provided with a cavitation chamber connecting said last-mentioned inlet with said gap.

5. An impulse-cavitation pressure reducer comprising a tube provided with inlet and outlet ends, a restricting element mounted in the tube and provided with a central opening therethrough, the wall of said opening converging from said tube at the inlet end of the opening to a point near its outlet end and then extending radially inward and forming an orifice-defining knife edge at said outlet end, and a bushing in said tube at the outlet end of said element provided with a central passage having an inlet end of substantially the same size as said orifice, the bushing being spaced a slight distance from said element to form an annular cavitation chamber between them so that as fluid leaves said orifice low pressure will be created in said chamber, and said chamber being provided with an inlet.

6. A pressure reducer according to claim 5, in which said bushing is formed to gradually reduce the velocity of the fluid after it passes said chamber.

7. A pressure reducer according to claim 5, in which said bushing is spaced a distance between about .010 and .100 inch from said knife edge.

8. A pressure reducer according to claim 5, in which the width of the radial portion of said wall is about one-quarter of the diameter of said orifice.

9. An impulse-cavitation pressure reducer comprising a fitting having a passage therethrough provided wtih inlet and outlet ends, a restricting element mounted in the passage and provided with a central opening therethrough, the wall of said opening converging from said passage at the inlet end of the opening to a point near its outlet end and then extending radially inward and forming an orifice-defining knife edge at said outlet end, a bushing in said passage at the outlet end of said element provided with a central passage having an inlet end substantially the same size as said orifice, the bushing being spaced a slight distance from said element to form an annular cavitation chamber between them so that as fluid leaves said orifice low pressure will be created in said chamber, said chamber being provided with an inlet, the fitting having a bypass connecting said chamber inlet with said passage at the inlet end of said restricting element, and a throttle valve controlling said bypass.

10. An impulse-cavitation pressure reducer comprising a tube provided with inlet and outlet ends for a fluid stream, a restricting element mounted in the tube and provided with a central opening therethrough, the wall of said opening converging from said tube at the inlet end of the opening to a point near its outlet end and then extending radially inward and forming an orifice-defining knife edge at said outlet end, whereby said radial wall will direct the peripheral portion of said fluid stream radially inward against the central portion of the stream as the stream flows across said knife edge to force an annular short section of the stream away from said edge in order to form a cavitation area around the stream at the downstream side of the knife edge, and a bushing in said tube at the outlet end of said restricting element provided with a central passage having an inlet adjacent said knife edge at least as large as said orifice, the inlet end of the bushing being spaced from said element to form an annular cavitation chamber located only around said cavitation area in communication with it so that fluid pressure in said chamber will be reduced, and said chamber being provided with an inlet spaced radially outward from said passage inlet.

11. An impulse-cavitation pressure reducer according to claim 10, including a bypass connecting said cavitation chamber inlet with said passage at the inlet end of said restricting element, and a throttle valve controlling said bypass.

References Cited in the file of this patent

UNITED STATES PATENTS

| | | |
|---|---|---|
| 2,153,450 | Borden | Apr. 4, 1939 |
| 2,456,626 | Dahnke | Dec. 21, 1948 |
| 2,842,962 | Dall | July 15, 1958 |

UNITED STATES PATENT OFFICE
CERTIFICATE OF CORRECTION

Patent No. 3,111,091 November 19, 1963

Paul O. W. Hopkinson

It is hereby certified that error appears in the above numbered patent requiring correction and that the said Letters Patent should read as corrected below.

Column 2, lines 32 and 33, for "fundamented" read -- fundamental --; column 3, line 25, after "reducer," insert the following:

in the absence of a bushing the constricted jet leaving the orifice might not expand soon enough to come into contact with the wall of pipe 10 before leaving the pipe, whereby the vacuum seal between the fluid stream and the encircling tubular member would be lost. The bushing prevents that from happening, provided the bushing is long enough, by materially reducing the effective inner diameter of the pipe. It will be seen that this flow member is not a venturi tube in form or in manner of operation.

In the embodiment of the invention shown in FIGS. 5 and 6 a block-like fitting 20 has a bore through it, through which extends a tube 21 that conducts a fluid from one location to another. The tube is sealed in the block. Inside the tube there is a restricting element 22 like the one shown in FIG. 4. It has an inclined surface 23 leading to an annular deflecting area 24 terminating in a knife edge defining an orifice 25. Spaced a short distance downstream from the restricting element is a bushing 26 that is considerably longer than the one shown in FIG. 4. The axial passage 27 through this bushing is enlarged at intervals so that the fluid jet issuing from orifice 25 can increase in diameter by small steps as it flows through the bushing, thereby reducing turbulence more than if the passage were the same size from end to end. The cavitation chamber 28 formed between the bushing and the restricting element is connected by an inlet port 29 in the top of the tube with a passage 30 in block 20, in the outer end of which a small pipe 31 is screwed. This pipe is connected with the material that is to be drawn into the stream flowing through tube 21. For example, if the tube 21 is the rinse line of a dishwashing machine, pipe 31 may be connected with a supply of wetting agent that it is desired 3,111,091 to have injected into the rinse water.

To control the rate at which the wetting agent is drawn same column 3, line 33, for "straeam" read -- stream --; column 4, line 24, after "many" insert -- times --.

Signed and sealed this 12th day of May 1964.

(SEAL)
Attest:

ERNEST W. SWIDER
Attesting Officer

EDWARD J. BRENNER
Commissioner of Patents